March 11, 1952 J. LAWRENCE 2,588,545
DISPLAY DEVICE FOR ILLUMINATED TRANSPARENCIES
Filed Dec. 19, 1949 2 SHEETS—SHEET 2
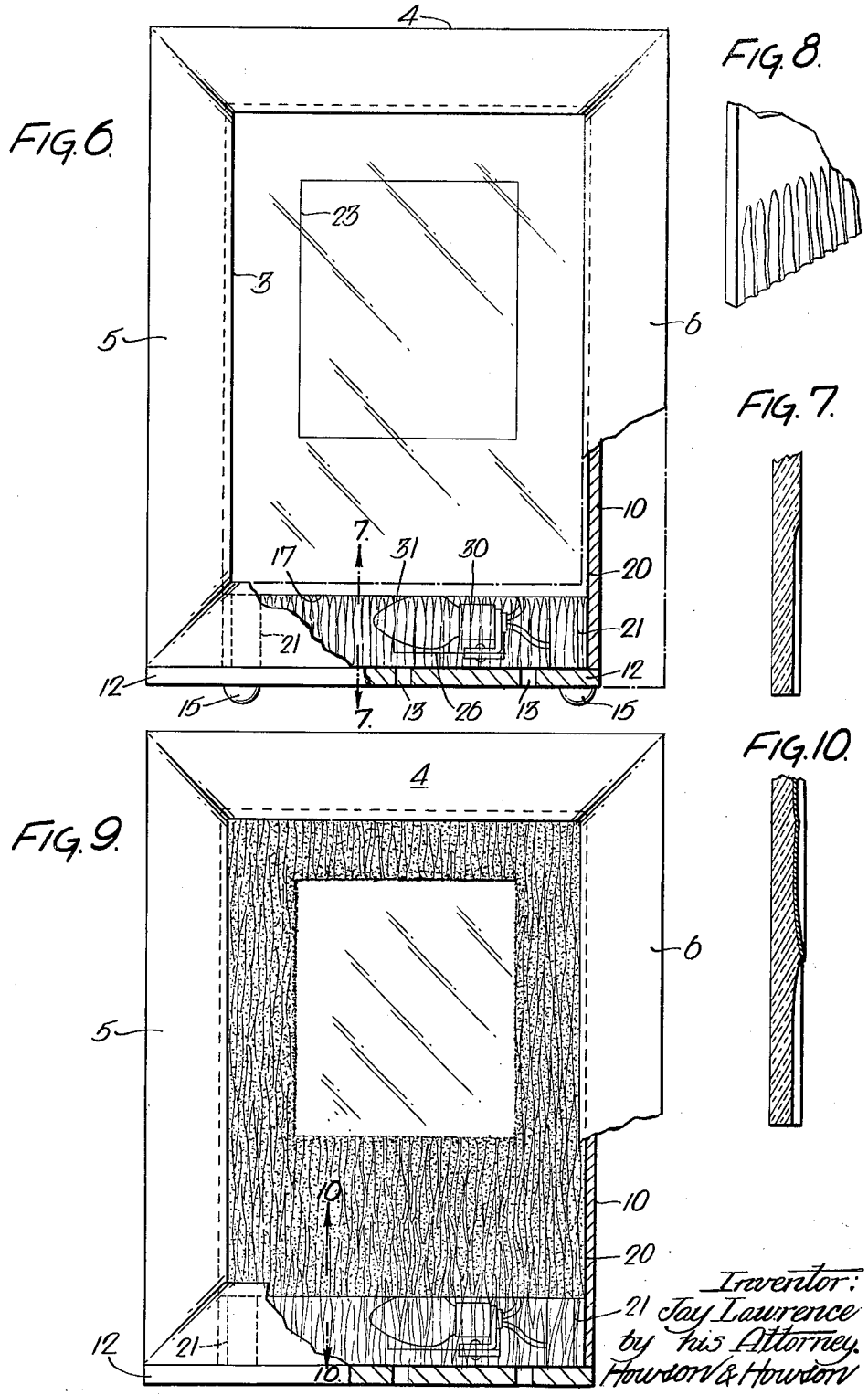

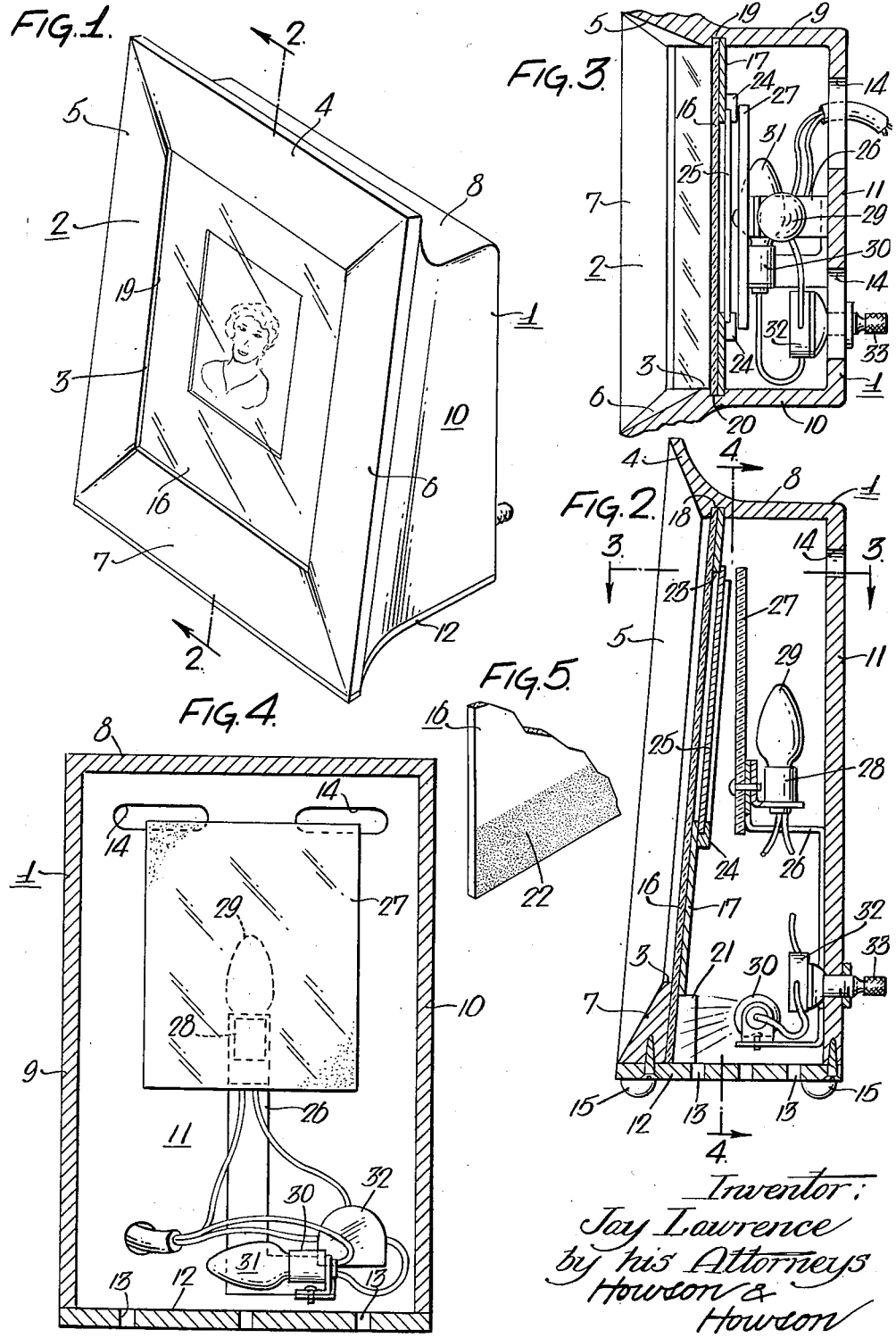

Patented Mar. 11, 1952

2,588,545

UNITED STATES PATENT OFFICE 2,588,545

DISPLAY DEVICE FOR ILLUMINATED TRANSPARENCIES

Jay Lawrence, Philadelphia, Pa.

Application December 19, 1949, Serial No. 133,840

8 Claims. (Cl. 40—152.2)

A principal object of this invention is to provide a novel device, including an illuminated transparency, capable of serving in a number of useful capacities such, for example, as a lamp or night-light, or as a medium for display of said transparencies.

Another object of the invention is to provide a device of the stated character wherein the primary transparency display is modulated and augmented by controlled illumination of other portions of the device.

Still another object of the invention is to provide in a device of the stated character modulating means including a plurality of light sources and means for selectively controlling said sources.

The invention resides also in certain novel structural details and arrangements hereinafter described and illustrated in the attached drawings wherein:

Fig. 1 is a view in perspective of one embodiment of the invention;

Fig. 2 is a sectional view on the line 2—2, Fig. 1;

Fig. 3 is a sectional view on the line 3—3, Fig. 2;

Fig. 4 is a sectional view on the line 4—4, Fig. 2;

Fig. 5 is a fragmentary view in perspective of one of the elements of the structures shown in the preceding figures;

Fig. 6 is a front elevational view with a portion of the casing broken away to illustrate a modification within the scope of the invention;

Fig. 7 is a sectional view on the line 7—7, Fig. 6;

Fig. 8 is a fragmentary view in perspective of one of the elements of the device;

Fig. 9 is a front elevational view similar to Fig. 6 illustrating still another modification; and Fig. 10 is a sectional view on the line 10—10, Fig. 9.

With reference to Figs. 1 to 5, inclusive, of the drawings, the embodiment of the invention therein illustrated comprises a casing 1 which may be composed of wood, metal, plastic or any suitable material. The front wall 2 of the casing has an opening 3, and the portions 4, 5, 6 and 7 of the wall which surround the opening 3 are slightly beveled, as indicated in Figs. 2 and 3, so as to give the effect of a picture or mirror frame. The casing also comprises a top wall 8, side walls 9 and 10, and a rear wall 11, and it will be noted that whereas the rear wall 11 is vertical the front wall 2 is inclined so that the casing has greater depth at the bottom than at the top. The casing is completed in the present instance by a detachable bottom wall 12 having openings 13 which function for a purpose hereinafter described. It will be noted also that the rear wall 11 is provided near the top with elongated openings 14. The casing in the present instance is adapted to rest on a table or other surface, and the bottom wall 12 is provided with depending feet 15, one at each corner, which preferably are made of rubber or other relatively soft material to preclude marring of the supporting surface, said feet functioning also to elevate the bottom wall 12 of the casing above the supporting surface.

The top and side walls of the casing are grooved in proximity to the front wall 2 for reception of the corresponding edges of plate-like elements 16 and 17, the grooves being indicated in Figs. 2 and 3 by the reference numerals 18, 19 and 20. The elements 16 and 17 may be entered in the slots from the bottom of the casing after removal of the bottom 12. The plate 16 which occupies the outer position forms a panel extending completely to the floor board or bottom wall 12; whereas the element 17 in back of the panel plate 16 is supported by blocks 21—21 at the opposite sides of and at the bottom of the casing. In the present instance the panel plate 16 is composed of clear plastic, the lower portion of the plate being roughened, by sanding or by other suitable means, as indicated at 22 in Fig. 5. This roughened lower portion of the plate is concealed behind the shield formed by the lower portion 7 of the front wall 2 but is exposed at the back below the lower edge of the element 17. This latter element, which is composed of opaque material and which serves as a mask as hereinafter set forth, has an opening 23 therein which is bordered on the inside of the element and at the bottom and both sides thereof by a rabbetted strip 24 which receive and support a transparency 25 containing a picture or ornamental design. This element 25 may, for example, take the form of a colored photographic transparency, or may consist of a transparent plate upon which has been superimposed an ornamental decalcomania. The nature and composition of this transparency may vary widely. It will be noted, however, that it is of a size to completely cover and to close the opening 23 in the element 17. Preferably this latter element will have a forward surface, visible through the transparent plate 16, of suitable color and texture to afford proper setting or mat for the transparency appearing through the window 23.

Supported on a bracket 26, secured in the present instance to the inner face of the rear wall 11 of the casing, is a diffusion plate 27 composed, for example, of translucent (but not transparent) plastic, frosted glass or the like; and also supported on the bracket 26 at the rear of the diffusion element 27 is a socket 28 for an electric bulb 29. A similar socket 30 is supported on the lower portion of the bracket for reception of an electric bulb 31, and both bulbs are connected in an electric circuit which includes a multi-throw switch 32 which is mounted on and extends through the rear wall 11 so that the actuating element 33 of the switch is exposed at the back of the casing. Preferably this switch is of a character such that in one of four alternative positions both of the lamps 29 and 31 will be extinguished; in another of said positions both of the lamps will be lighted; in a third position one only of the two lamps will be lighted; and in the fourth position the other lamp only will be energized.

The mode of operation of the device will be apparent. When the lamp 29 is energized, the light from that source diffused by the element 27 will illuminate with substantial uniformity the transparency 25 supported in the window 23 of the masking element 17 as described above. When the lamp 29 is the sole source of illumination the illumination will be concentrated in the transparency. The nature of the light issuing from the device will then depend entirely on the character of the transparency and may vary from a substantial illumination to a softly colored glow suitable for example for night-light purposes. When the lamp 31 constitutes the only source of light the illumination of the transparency will be of relatively low order, and light collected by the lower roughened portion 22 of the panel plate 16 will show in the form of a mild illumination extending upwardly above the inner edge of the bottom portion 7 of the front wall transmitted through the transparent material of the plate 16, this illumination gradually diminishing in intensity with increasing distance from the said edge, the illumination being entirely dissipated, however, before it reaches the lower edge of the transparency. In either of the aforesaid cases the illumination may be of a character well suited for night-light purposes.

If a greater brilliancy is desired for display purposes, both of the lamps 29 and 31 may be energized with a highly ornamental composite effect. Depending on the density of the transparency 25, the light emitted from the device may then be of relatively high or low intensity as desired.

It will be noted that by reason of the elevation of the bottom wall 12 above the underlying surface through medium of the feet 15, the apertures 13 are available for circulation of air upwardly through the device. The air contacting the bulbs 29 and 31 and heated thereby will rise to the top of the casing, and will pass from the latter through the slotted elongated openings 14. Cool air will then flow inwardly through the openings 13 to replace the outflowing heated air, and being heated in turn will set up a convective flow through the casing that will preclude overheating.

A more pronounced illumination of the lower portion of the device may be obtained by scoring the lower portion of the panel plate 16 after the manner illustrated in Figs. 6, 7 and 8; and a somewhat different but highly desirable effect is obtainable by extending the scorings at the back of the transparent plate 16 upwardly over the entire vertical height of the latter as shown in Figs. 9 and 10, it being noted however that the scoring of the rear surface of the plate does not extend to the portion which registers with the window 23 of the masking plate 17. In the embodiment of Figs. 9 and 10 the scored areas of the plate 16 are preferably coated with a suitable pigmented paint or strain to thereby afford, in conjunction with the scorings, a highly desirable ornamental effect.

It will be apparent that the device is subject to still further modification without departure from the invention as defined in the appended claims. It will be apparent also that the invention may find embodiment in a form suitable for attachment to or suspension from a wall surface and is not limited to a device for table mounting.

I claim:

1. In an illuminated device of the character described, a casing having a front wall panel of transparent material, an opaque shield overlying and concealing the lower portion of the panel, the rear surface of said lower portion being roughened, masking means at the back of said panel covering the exposed area of the panel with exception of an intermediate portion, said masking means being excluded also from the said concealed lower portion of the panel, a transparency supported at the back of the panel within and covering the said unmasked intermediate portion, and means in said casing for illuminating the transparency and the said concealed lower portion of the panel.

2. A device according to claim 1 wherein the said inner surface of the concealed lower portion of the panel is scored vertically.

3. A device according to claim 2 wherein the said masking means consists at least in part of an opaque coating on the back of the panel.

4. A device according to claim 3 wherein the vertical scorings of the concealed lower portion of the panel are extended upwardly over the entire masked area of the panel.

5. A device according to claim 1 wherein the masking means includes a mat at the back of the panel, said mat comprising the means for supporting the transparency behind the unmasked intermediate portion of the panel.

6. A device according to claim 5 wherein the mat consists of a sheet of opaque material having an opening registering with the unmasked portion of the panel and having means at the back thereof for detachably supporting said transparency behind said opening.

7. A device according to claim 1 wherein the illuminating means includes a plurality of light sources located respectively in proximity to the transparency and to the unmasked lower portion of the panel.

8. A device according to claim 7 wherein means is provided for independent control of the light sources.

JAY LAWRENCE.

REFERENCES CITED

The following references are of record in the file of this patent:

UNITED STATES PATENTS

| Number | Name | Date |
| --- | --- | --- |
| 1,859,516 | Keyes | May 24, 1932 |
| 2,167,458 | Lieberman | July 25, 1939 |
| 2,347,665 | Christensen | May 2, 1944 |
| 2,513,576 | Luray | July 4, 1950 |